(No Model.)
G. H. MOLLER.
GLOVE FASTENER.
No. 553,866. Patented Feb. 4, 1896.
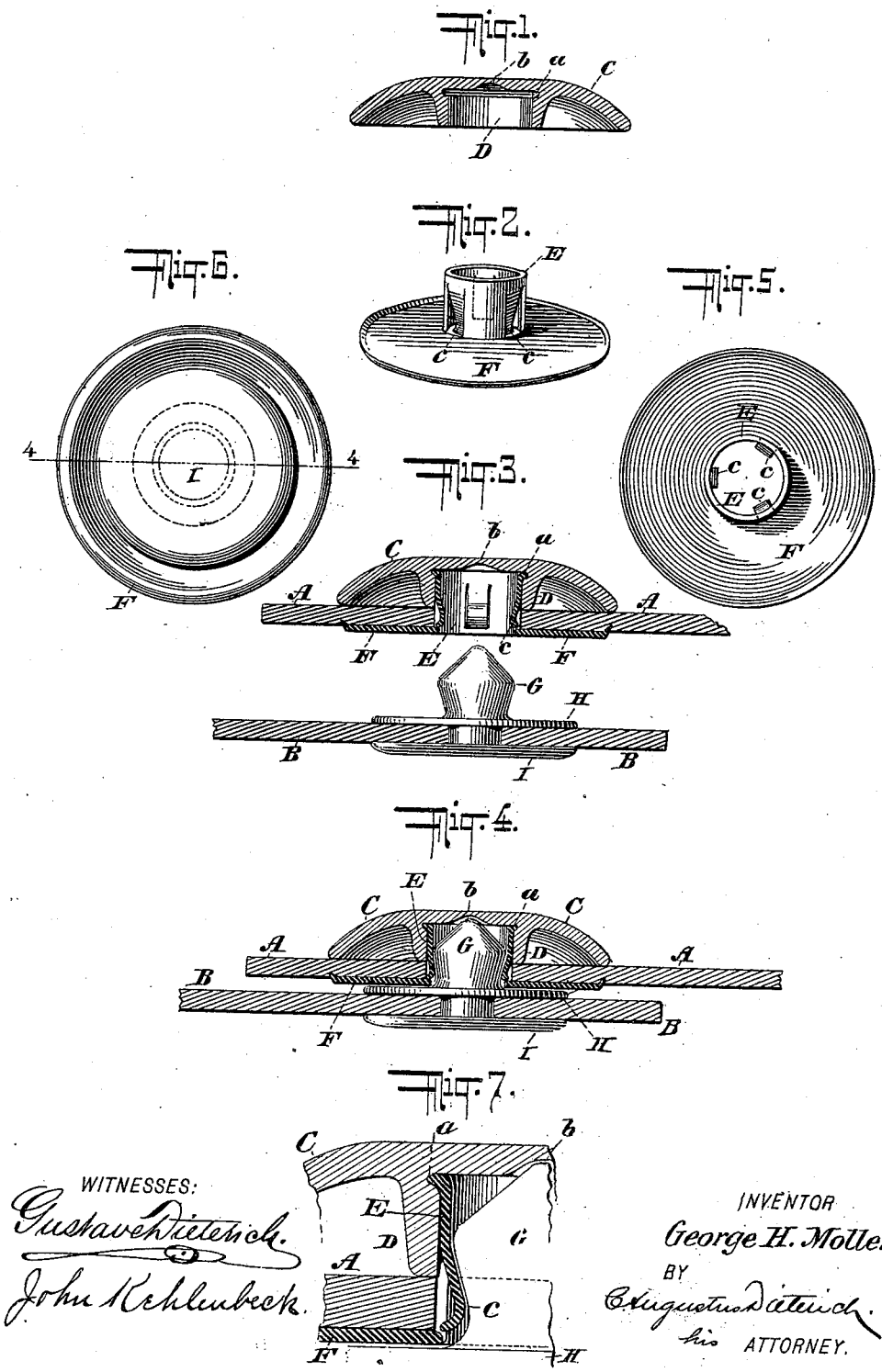
WITNESSES:
Gustave Dieterich
John Kehlenbeck
INVENTOR
George H. Moller
BY
C. Augustus Dieterich
his ATTORNEY.

UNITED STATES PATENT OFFICE.

GEORGE H. MOLLER, OF MORRISTOWN, NEW JERSEY, ASSIGNOR TO HAROLD G. MOLLER, OF SAME PLACE.

GLOVE-FASTENER.

SPECIFICATION forming part of Letters Patent No. 553,866, dated February 4, 1896.

Application filed December 29, 1894. Serial No. 533,252. (No model.)

*To all whom it may concern:*

Be it known that I, GEORGE H. MOLLER, a citizen of the United States, residing at Morristown, Morris county, in the State of New Jersey, have invented certain new and useful Improvements in Glove-Fasteners, of which the following is a full, clear, and exact description.

My invention relates more particularly to that class of fasteners adapted for use on gloves, umbrella-bands, &c., comprising a stud-and-socket member; and it consists in the combination, connection and arrangement of parts hereinafter more fully set forth.

The object of my invention is to produce a button-fastener for the purposes set forth out of the fewest possible parts, and one which will require no complicated machinery for uniting the said parts.

Heretofore in making fasteners of this character it has been the custom to make both the stud and the socket members out of many parts, which had to be united before they could be attached to the article upon which they were to be used. Now, according to my invention, I construct the socket member of my fastener of but two pieces, which do not require any previous uniting before the same is ready to be attached to the glove or article upon which it is to be used. All that is necessary is to punch a hole through the article and insert from below, the eyelet portion, and unite the same, by pressure, with the cap, thereby clamping the material intermediate the cap and flange portion of the eyelet.

The stud portion may be of any suitable construction, preferably that herein described and shown in the drawings, wherein it consists of two portions riveted together and clamping between them the intermediate material.

In the accompanying drawings, forming part of this specification, wherein like letters indicate like parts, Figure 1 is an enlarged sectional view of the dished cap, showing the socket on the under side thereof. Fig. 2 is an enlarged detail perspective view of the eyelet portion, which, when united with the cap, forms the socket member of the fastener. Fig. 3 is a sectional view showing the cap and eyelet portion united and clamping the intermediate material, and likewise showing the stud member attached to the under flap of the glove or article ready to be inserted in the socket member. Fig. 4 is a view similar to Fig. 3, showing the stud engaged with the socket. Fig. 5 is a top view of the eyelet portion shown in perspective at Fig. 2. Fig. 6 is a bottom view of the stud engaged with the socket, the intermediate material being removed; and Fig. 7 is a detail sectional view, greatly enlarged, showing the manner in which the two portions comprising the socket member are united and showing the stud engaged with the inwardly-projecting springs of the tubular eyelet.

In the drawings, A B designate the overlapping flaps of the glove or article; C, the dished cap or button, having a socket D on its under side provided with an annular groove $a$ extending around the base of the socket and a circular recess $b$ in the center thereof. Into this socket D is securely fitted a tubular eyelet E, having a circular flange F bent at right angles thereto and inwardly-projecting springs $c$, said tubular eyelet passing through the material A intermediate the flange F and cap C and securely clamping the same when the two portions of the socket member are united by the enlargement of the upper end of the tubular eyelet E, which locks in the annular groove $a$ of the socket D.

The stud member consists of the head G, having a circular base H, and secured from the under side of the material to which it is attached by a washer I riveted to the base H. This head G has a downwardly-tapering shank and a conical top, and is so formed as to cause the widest portion thereof to fit snugly within the tubular eyelet E and permit the apex to enter the recess $b$ in the base of the socket. When the head G has been driven home, the shank thereof will be encompassed by the inwardly-projecting springs $c$ and held securely in place thereby.

The extreme ends of the springs $c$ are bent slightly outward to render the same less liable to injury and to facilitate the insertion of the head G of the stud member.

Having thus described my invention, what I claim, and desire to secure by Letters Patent, is—

A socket member of a glove-fastener, comprising a dish-shaped cap socketed on its under side, said socket having a circular recess in the center, and an annular groove extending around the base thereof, and a tubular eyelet having inwardly-projecting springs, and a circular flange integral therewith disposed at right angles thereto, said cap and circular flange being adapted to securely clamp the fabric intermediate the same when united by the enlargement of the mouth of the tubular eyelet within the annular groove of the socket, substantially as herein shown and described.

Signed at the city of New York, in the county and State of New York, this 26th day of October, 1894.

GEORGE H. MOLLER.

Witnesses:
GUSTAVE DIETERICH,
JOHN KEHLENBECK.